(12) United States Patent
Margomenos et al.

(10) Patent No.: US 9,331,735 B1
(45) Date of Patent: May 3, 2016

(54) GAN BASED ACTIVE CANCELLATION CIRCUIT FOR HIGH POWER SIMULTANEOUS TRANSMIT AND RECEIVE SYSTEMS

(71) Applicant: HRL Laboratories, LLC, Malibu, CA (US)

(72) Inventors: Alexandros D. Margomenos, Pasadena, CA (US); Miroslav Micovic, Thousand Oaks, CA (US); Ara K. Kurdoghlian, La Canada, CA (US)

(73) Assignee: HRL Laboratories, LLC, Malibu, CA (US)

( * ) Notice: Subject to any disclaimer, the term of this patent is extended or adjusted under 35 U.S.C. 154(b) by 105 days.

(21) Appl. No.: 14/284,654

(22) Filed: May 22, 2014

(51) Int. Cl.
*H04B 1/44* (2006.01)
(52) U.S. Cl.
CPC ........................................ *H04B 1/44* (2013.01)
(58) Field of Classification Search
CPC ............ H04B 1/48; H04B 1/44; H04B 1/525; H04B 1/406; H04B 11/18; H04B 1/405; H04B 1/40; H04B 1/005
USPC ............... 455/76–78, 118–120, 126.1, 127.1, 455/127.2, 255–260, 313, 323, 334
See application file for complete search history.

(56) References Cited

U.S. PATENT DOCUMENTS

| | | | | |
|---|---|---|---|---|
| 5,355,103 A * | 10/1994 | Kozak | ................... | H03F 1/3241 333/28 R |
| 6,693,971 B1 * | 2/2004 | Kowalski | ............... | H04B 15/00 375/285 |
| 6,836,671 B2 * | 12/2004 | Haigh | ................... | H03F 1/3223 455/114.2 |
| 8,086,206 B1 * | 12/2011 | Lackey | ................. | H04B 1/525 455/296 |
| 8,090,338 B1 * | 1/2012 | Lackey | ................. | H04B 1/525 415/296 |

OTHER PUBLICATIONS

G. Karawas, K. Goverdhanam, J. Koh, "Wideband active interference cancellation techniques for military applications" 5th European Conference on Antennas and Propagation, (Apr. 2011) PP. 390-392.
K. Lin et al, "A Ka-band FMCW radar front-end with adaptive leakage cancellation", IEEE Transactions on Microwave Theory and Techniques, vol. 54, No. 12, (Dec. 2006) pp. 4041-4048.
A. Zahedi-Ghasabeh et al, "Active interference cancellation for user coexistence in the presence of I/Q imbalance", 2010 Military Communications Conference, MILCOM2010 pp. 261-265.
J. E. Kleider et al, "OFDM subcarrier interference cancellation for non-linear PA distortion", 2009 Military Communications Conference, MILCOM2009 pp. 1-7.

(Continued)

*Primary Examiner* — Nhan Le
(74) *Attorney, Agent, or Firm* — Ladas & Parry (57) ABSTRACT

A cancellation circuit for a simultaneous transmit and receive system includes a variable attenuator, a variable coarse true time delay a variable fine true time delay, the variable fine true time delay having a cancellation signal output, a circulator coupled to a transmit signal and having a receive signal input and having an output having a sum of the receive signal and a leakage signal, the leakage signal being a portion of the transmit signal leaking through the circulator, a 180° hybrid having a delta output having a difference between the sum of the receive signal and a leakage signal and the cancellation signal, and a control circuit coupled to the delta output and the variable attenuator, the variable coarse true time delay, and the variable fine true time delay to adjust an amplitude and phase of the cancellation signal.

21 Claims, 6 Drawing Sheets

(56) References Cited

OTHER PUBLICATIONS

J. Laskar et al, "An active integrated circuit wireless interference cancellation solution", IEEE International Microwave Symposium (2005) pp. 559-562.

H. Yamaguchi, "Active interference cancellation technique for MB-OFMD cognitive radio", European Microwave Conference (2004) pp. 1105-1108.

F.J. Kub et al, "Self-calibrating hybrid analog CMOS co-site interference canceller", 1999 Military Communications Conference, MILCOM1999 pp. 1051-1054.

J-K Lee et al, "A design of co-channel feedback interference cancellation system using analog control", European Microwave Symposium (2006) pp. 153-156.

W. Chappell et al, "Small antenna array near field cancellation using tunable resonators for simultaneous transmit and receive", GOMACTECH (2012) pp. 241-244.

J.D. Roderick et al, "A 4-bit ultra-wideband beamformer with 4ps true time delay resolution", IEEE Custom Integrated Circuits Conference (2005) pp. 28-4-1-28-4-4.

TGS2353, www.triquint.com pp. 1-10 (Jun. 20, 2011).

AMMC-2008, www.avagotech.com pp. 1-7 (Jun. 23, 2008).

AMMC-6640, www.avagotech.com pp. 2-11 (Sep. 27, 2010).

* cited by examiner

Attenuator

| | Present Disclosure | Prior Art |
|---|---|---|
| Frequency (GHz) | X-band | 0.5-18 [11], 0.2-50 [15] |
| Attenuation Range (dB) | 1-5 | 4-20 [11], 2-26 [15] |
| P_1dB (dBm) | 36 | 26 [11,15] |
| RF Survivability (W) | >6 | 1 [11,15] |

SPDT

| | Present Disclosure | Prior Art |
|---|---|---|
| Frequency (GHz) | 6-24 | DC-18 [12], DC-20 [13] |
| Loss (dB) | 1 | 1.5 [12] |
| Isolation (dB) | 30 | 40 [14] |
| P_1dB (dBm) | 40 | 40 [13] |
| RF Survivability (W) | 15 | 10 [12] |

SP4T

| | Present Disclosure | Prior Art |
|---|---|---|
| Frequency (GHz) | 6-24 | DC-18 [16] |
| Loss (dB) | 1.6 | 2.1 [16] |
| Isolation (dB) | 30 | 30 [16] |
| P_1dB (dBm) | 37 | 24 [16] |
| RF Survivability (W) | 10 | 0.25 [16] |

Coupler

| | Present Disclosure | Prior Art |
|---|---|---|
| Frequency (GHz) | 6-16, 10-24 | 12-21 [17] |
| Loss (dB) | 0.25 | 0.25 [17] |
| RF Survivability (W) | 10 | 1 [17] |

Coarse tunable time delay

| | Present Disclosure | Prior Art |
|---|---|---|
| Frequency (GHz) | X-band | |
| Loss (dB) | 2 | |
| RF Survivability (W) | 10 | |

Fine tunable time delay

| | Present Disclosure | Prior Art |
|---|---|---|
| Frequency (GHz) | X-band | 6-18 [18], 8-12 [19] |
| Loss (dB) | 4 | 9 [18], 5 [19] |
| RF Survivability (W) | 10 | 1 [18], 0.5 [19] |

FIG. 6

GAN BASED ACTIVE CANCELLATION CIRCUIT FOR HIGH POWER SIMULTANEOUS TRANSMIT AND RECEIVE SYSTEMS

CROSS REFERENCE TO RELATED APPLICATIONS

None.

STATEMENT REGARDING FEDERAL FUNDING

None.

TECHNICAL FIELD

This disclosure relates to cancellation circuits, and in particular cancellation circuits for simultaneous transmit and receive (STAR) systems.

BACKGROUND

There are many applications in which it is desirable or necessary to simultaneously transmit and receive. Such applications include coherent repeaters and transponders, as well as some electronic warfare and communication systems.

Cancellation circuits are needed to enable simultaneous transmit and receive (STAR) functionality. In the prior art there are components and systems for cancellation circuits; however, these prior art circuits do not have the desired power handling, linearity and bandwidth needed for high performance systems.

Such prior art systems have been described in the following references.

REFERENCES

[1] G. Karawas, K. Goverdhanam, J. Koh, "Wideband active interference cancellation techniques for military applications" 5$^{th}$ European Conference on Antennas and Propagation, April 2011.
[2] K. Lin et al, "A Ka-band FMCW radar front-end with adaptive leakage cancellation", IEEE Transactions on Microwave Theory and Techniques, vol. 54, no. 12, December 2012.
[3] A. Zahedi-Ghasabeh et al, "Active interference cancellation for user coexistence in the presence of I/Q imbalance", 2010 Military Communications Conference, MILCOM2010.
[4] J. E. Kleider et al, "OFDM subcarrier interference cancellation for non-linear PA distortion", 2009 Military Communications Conference, MILCOM2009.
[5] J. Laskar et al, "An active integrated circuit wireless interference cancellation solution", IEEE International Microwave Symposium 2005.
[6] H. Yamaguchi, "Active interference cancellation technique for MB-OFMD cognitive radio", European Microwave Conference 2004.
[7] F. J. Kub et al, "Self-calibrating hybrid analog CMOS co-site interference canceller", 1999 Military Communications Conference, MILCOM1999.
[8] J-K Lee et al, "A design of co-channel feedback interference cancellation system using analog control", European Microwave Symposium 2006.
[9] W. Chappell et al, "Small antenna array near field cancellation using tunable resonators for simultaneous transmit and receive", GOMACTECH 2012.
[10] J. D. Roderick et al, "A 4-bit ultra-wideband beamformer with Ops true time delay resolution", IEEE Custom Integrated Circuits Conference 2005.
[11] TGL6425-SCC, www.triquint.com
[12] TGS2353, www.triquint.com
[13] HMC347, www.hittite.com
[14] AMMC-2008, www.avagotech.com
[15] AMMC-6640, www.avagotech.com
[16] HMC641, www.hittite.com
[17] TGB2001, www.triquint.com
[18] TGB6336, www.triquint.com
[19] HMC543, www.hittite.com What is needed is an improved cancellation circuit that has improved power handling, linearity and bandwidth. The embodiments of the present disclosure answer these and other needs.

SUMMARY

In a first embodiment disclosed herein, a cancellation circuit for a simultaneous transmit and receive system comprises a coupler coupled to a transmitter for providing a portion of a transmit signal, a variable attenuator coupled to the coupler, a variable coarse true time delay coupled to an output of the variable attenuator, a variable fine true time delay coupled to an output of the variable coarse true time delay, the variable fine true time delay having a cancellation signal output, a circulator coupled to the transmit signal and having a receive signal input and having an output having a sum of the receive signal and a leakage signal, the leakage signal being a portion of the transmit signal leaking through the circulator, a 180° hybrid having a first input coupled to the cancellation signal output of the variable fine true time delay, a second input coupled to the output having the sum of the receive signal and the leakage signal, and a delta output having a difference between the first input and the second input, the delta output coupled to a receiver, a power detector coupled to the delta output, and a control circuit coupled to the power detector, the control circuit coupled to the variable attenuator, the variable coarse true time delay, and the variable fine true time delay to adjust an amplitude and phase of the cancellation signal.

In another embodiment disclosed herein, a method of providing cancellation for a simultaneous transmit and receive system comprises attenuating a portion of a transmit signal using a variable attenuator, selecting a coarse true time delay to delay the attenuated transmit signal using a variable coarse true time delay, selecting a fine true time delay of an output of the selectable coarse true time delay to form a cancellation signal using a variable fine true time delay, providing a sum of a receive signal and a leakage signal from the transmitter, providing a delta output having a difference between the cancellation signal and the sum of the receive signal and the leakage signal to a receiver, and controlling the variable attenuator, the variable coarse true time delay, and the variable fine true time delay using the delta signal to adjust an amplitude and phase of the cancellation signal.

In yet another embodiment disclosed herein, a cancellation circuit for a simultaneous transmit and receive system comprises a variable attenuator, a variable coarse true time delay coupled to the variable attenuator, a variable fine true time delay coupled to the variable coarse true time delay, the variable fine true time delay having a cancellation signal output, a circulator coupled to a transmit signal and having a receive signal input and having an output having a sum of the receive signal and a leakage signal, the leakage signal being a portion of the transmit signal leaking through the circulator, a 180° hybrid having a delta output having a difference between the sum of the receive signal and a leakage signal and the cancellation signal, a power detector coupled to the delta output, and a control circuit coupled to the power detector and the variable attenuator, the variable coarse true time delay, and the variable fine true time delay to adjust an amplitude and phase of the cancellation signal.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes cancellation circuits that have high-linearity, high dynamic range, low-noise and wideband X-band performance for simultaneous transmit and receive (STAR) functionality. Applications include coherent repeaters and transponders, electronic warfare (EW) systems and communication systems. The described GaN cancellation circuits when combined with GaN receivers and GaN transmitters, can provide over one order of magnitude improvement in transmitted power during STAR operation without desensitizing the receiver, which is important in an electronic warfare jamming application. Further, some EW systems require a long "listen" periods, called look-through, when the jammer cannot transmit. The cancellation circuit of the present disclosure can reduce or eliminate the need for look-through.

In addition to preventing the receiver from saturation, the cancellation circuit provides a 30 dB higher signal-to-noise ratio for the same intermodulation rejection (IMR) ratio and instantaneous bandwidth. Also provided is the ability to receive low power signals generated from friendly communication signals, or low power signals from hostile transmissions in order to be able to jam them. The disclosed cancellation circuits can provide an 18 dB linearity improvement, over 10× improvement in power handling and robustness, and a 5× improvement in reducing signal loss compared to the prior art.

Prior art technologies implemented in GaAs, InP, SiGe and CMOS cannot match these improvements due to their lower breakdown voltages, which are less than 6 volts, their susceptibility to large incoming signals, and limited dynamic range, as described in References [1-9] above.

Figure 6:
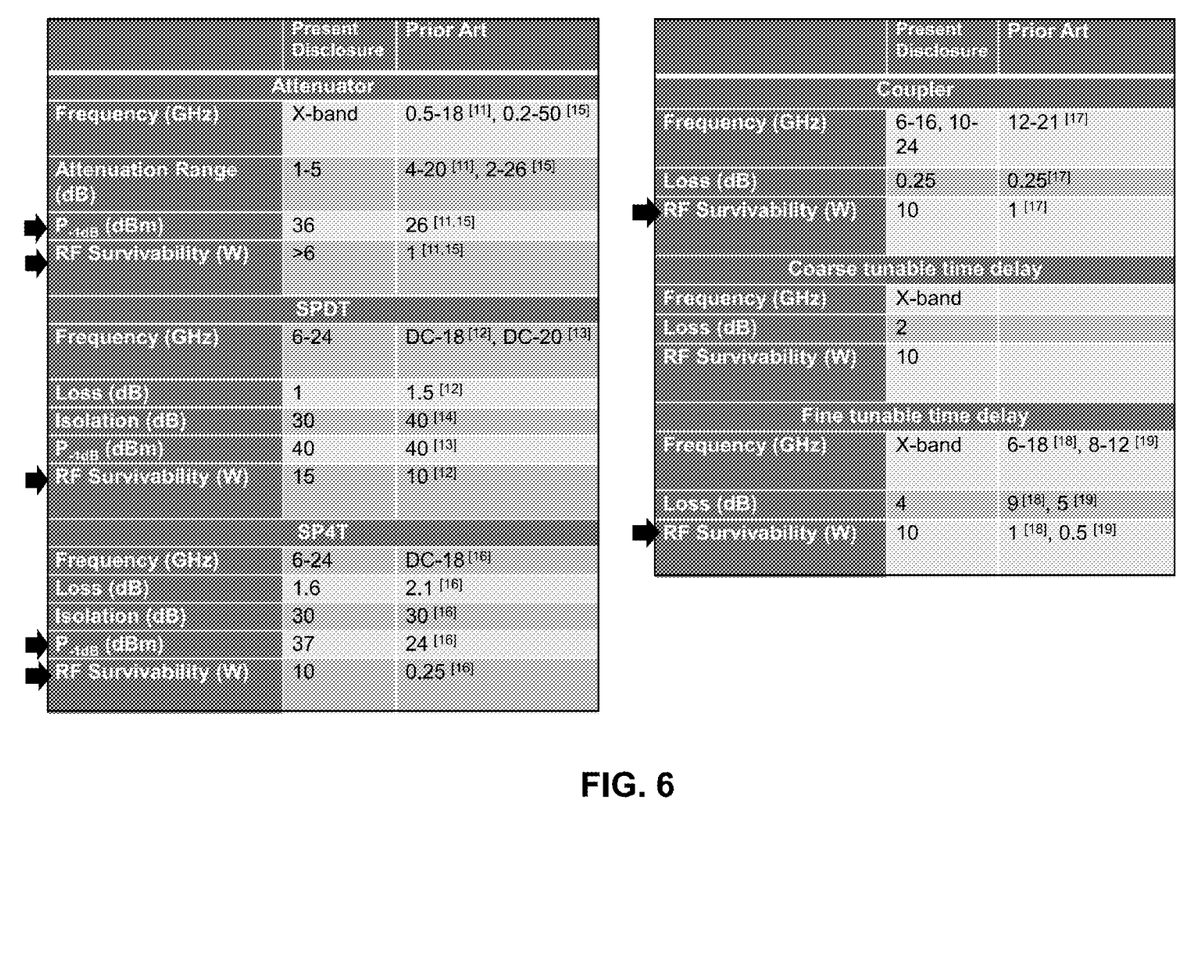
FIG. 6 shows a table comparing example specifications of the present disclosure to prior art specifications.

In the prior art, active cancellation schemes in digital or analog are available for low power operation. However, these technologies cannot handle power levels above 1-2 W. The table shown in FIG. 6 summarizes the performance of an example cancellation circuit in accordance with the present disclosure compared to the performance of the prior art.

Other potential III-V technologies cannot offer the same device performance and lack the thick metallization process of the present disclosure. SiGe and CMOS components offer very high level of integration and multi-functionality, however cannot meet the required power handling, RF survivability, linearity and dynamic range for this application. Furthermore, due to high scaling, low-loss metallizations are not readily available.

Radio frequency (RF) micro-electro-mechanical switches (MEMS) have also been used in the prior art; however, RF-MEMS typically cannot handle very high RF powers due to self-actuation, have limited reliability under hot-switching, and have switching speeds in the millisecond scale, which is slower than desired.

Figure 1:
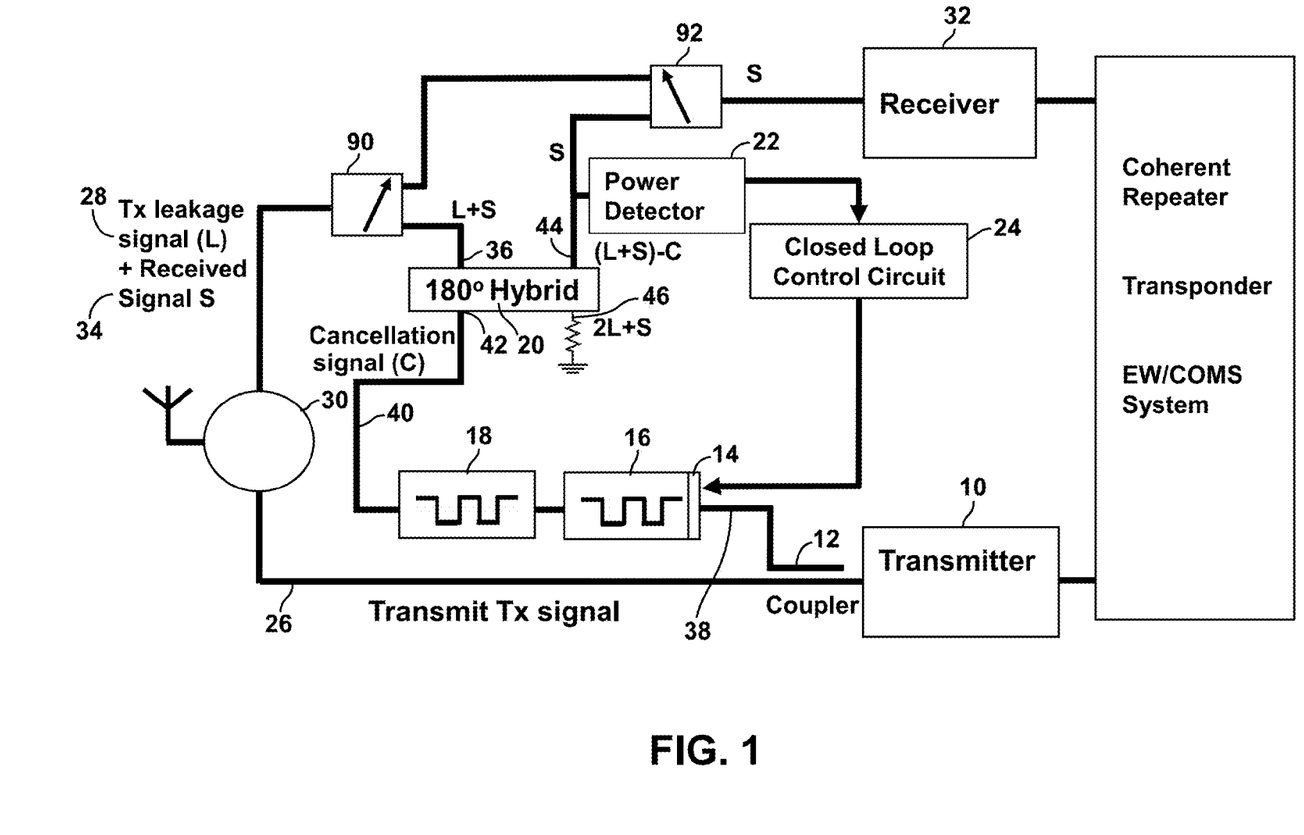
FIG. 1 shows a block diagram of a GaN active cancellation circuit used in a simultaneous transmit and receive system in accordance with the present disclosure.

FIG. 1 shows a block diagram of a GaN active cancellation circuit embedded in a STAR system with a transmitter 10 and a receiver 32. The cancellation system includes a coupler 12, a variable attenuator 14, a variable coarse true time delay 16, a variable fine true time delay 18, a 180° hybrid 20, a power detector 22, and a closed loop control circuit 24.

As shown in FIG. 1, when a transmit or jamming signal 26, which may be 100 watts, is transmitted, a portion L 28 of the transmit signal, which may be approximately 2 W, is leaked through the circulator 30, which may be expected for a circulator 30 with 17-20 dB isolation to the receiver 32. Such high leakage power will permanently damage any GaAs, SiGe/CMOS or InP LNA in a receiver 32, but will only temporarily desensitize a GaN LNA. However, even with GaN technology, during a transmit period the LNA will not be able to detect any small signals (µW-mW) generated by friendly communication systems or hostile sources that need to be detected and possibly jammed.

As shown in FIG. 1, the leakage signal L 28 that leaks through the circulator 30, is added to the received signal (S) 34 and fed into the input 36 of a 180° hybrid 20. A portion 38 of the transmit signal 26 is coupled by coupler 12 and fed into the variable attenuator 14, the variable coarse true time delay 16, and the variable fine true time delay 18. The output of the variable fine true time delay 18 is a cancellation signal (C) 40 which is also fed into input 42 of the 180° hybrid 20. When the phase and amplitude of C 40 and L 28 are aligned, they cancel each other out at the difference (Δ) port 44 of the 180° hybrid 20 allowing only the received signal (S) 34 to flow into the receiver 32. In order to achieve the cancellation the closed loop control circuit 24 monitors the detected power at the Δ port 44 and adjusts the phase and amplitude of C 40 by controlling the variable attenuator 14, the variable coarse true time delay 16, and the variable fine true time delay 18 until the detected power is minimized.

The cancellation circuit needs to have circuit components that can survive and maintain linear operation while handling input signals, which may be 2 W, while having a small impact on the overall system noise figure (NF). The cancellation circuit also needs to have features of low insertion loss to maximize efficiency, and achieve high dynamic range and accurate phase and amplitude control. Parts of the cancellation circuit, and particularly the 180° hybrid 20, need to have the ability to handle higher powers, which may be up to 4 W on the sum (Σ) port 46 of the 180° hybrid 20. From a circuit design perspective, the most challenging aspect is the accurate phase and amplitude control.

Figure 2:
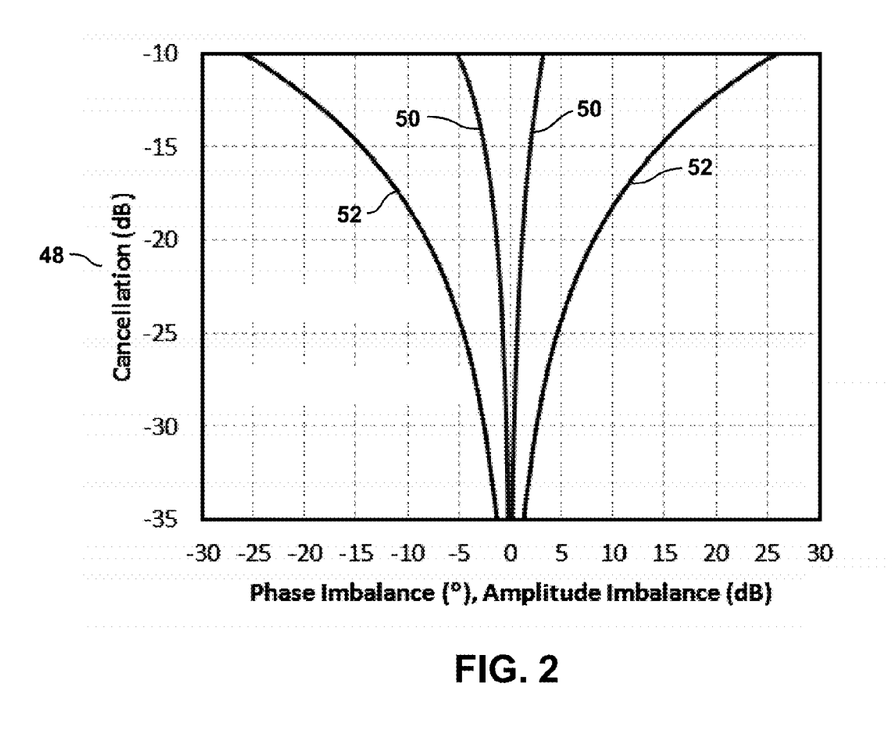
FIG. 2 shows a simulated response of cancellation for a 180° hybrid couple for two 2 watt (W) signals fed to its input ports in accordance with the present disclosure.

FIG. 2 shows the simulated response when the 180° hybrid 20 is fed with two 2 W signals. The cancellation 48 on the difference (Δ) port 44 of the 180° hybrid 20 is plotted vs. potential amplitude imbalance 50 and potential phase imbalance 52. To achieve a 10 dB cancellation 48, the phase imbalance 52 needs to be less than 52° or the amplitude imbalance 50 needs to be less than 8 dB. For 20 dB cancellation 48, the phase imbalance 52 needs to be less than 16° or the amplitude imbalance 50 needs to be less than 3 dB.

Figure 3:
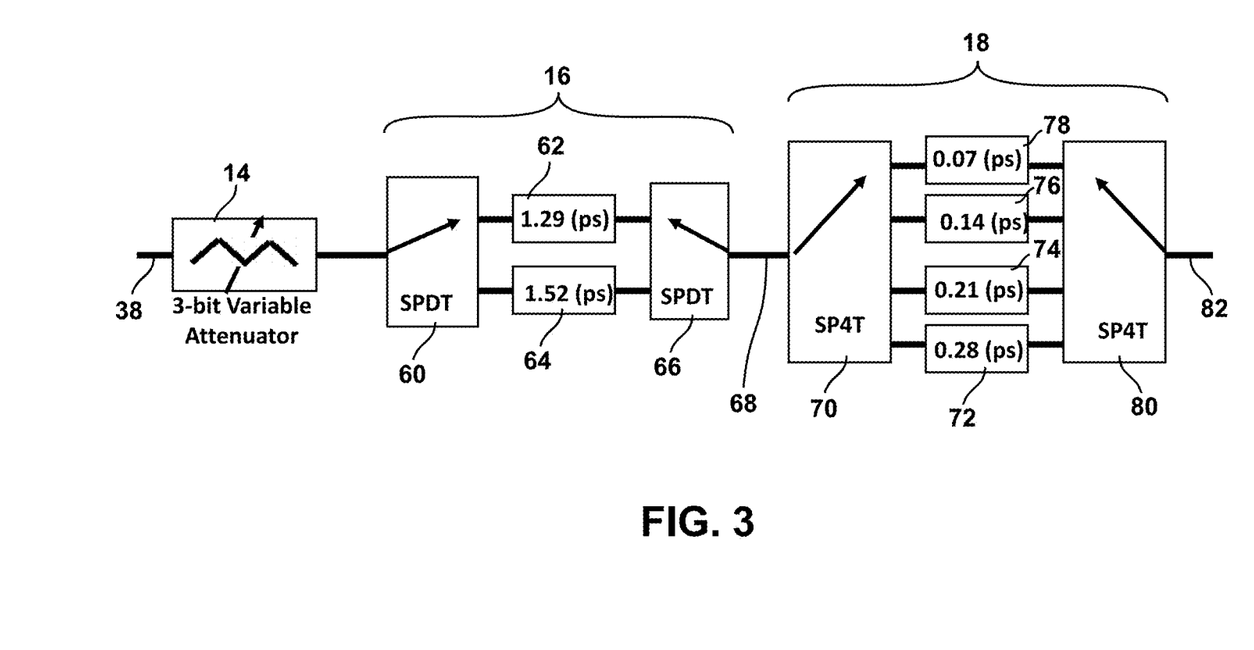
FIG. 3 shows a block diagram of a variable attenuator, a variable coarse true time delay, and a variable fine true time delay for amplitude adjustment and phase alignment of a cancellation signal in accordance with the present disclosure.

In order to achieve this amplitude and phase control over a wide bandwidth, fully passive phase and amplitude adjustment circuits are used for the variable attenuator 14, the variable coarse true time delay 16, and the variable fine true time delay 18. The advantage of this approach, is that it eliminates the phase shifts caused by amplitude modulation-phase modulation (AM-PM) errors created by amplifiers used in phase rotators or variable gain amplifiers when these are operated under compression. For high power transmissions, which may be 100 W, and leakage signals, which may be 2 W, the circuits used need to be able to maintain linearity and have minimum AM-PM errors when operating under compression.

As shown in FIG. 1, a portion 38 of the transmitted signal is fed into the variable attenuator 14, the variable coarse true time delay 16, and the variable fine true time delay 18.

FIG. 3 shows a block diagram of a variable attenuator 14, a variable coarse true time delay 16, and a variable fine true time delay 18, which are used for amplitude adjustment and phase alignment of the cancellation signal 40.

The coupled signal 38 first is first attenuated by variable attenuator 14, which may in one embodiment be a 3-bit GaN variable attenuator which has 1-4.5 dB attenuation. The output of the variable attenuator 14 is fed into the variable coarse true time delay 16, which has a single-pole-double-throw (SPDT) switch 60 with high linearity over a wide frequency band, which may in one embodiment be X band. The single-pole-double-throw (SPDT) switch 60 routes the signal through a selected one of two different delay lines 62 and 64. Another single-pole-double-throw (SPDT) switch 66 then routes the signal from the selected delay line 62 or 64 to the output 68 of the coarse true time delay 16. Although only two delay lines were used in the embodiment described, a person skilled in the art would understand that more delay lines and larger switches may be used.

The output 68 of the variable true time delay 16 14 is fed into the variable fine true time delay 16, which has a single-pole-four-throw (SPOT) switch 70 with high linearity over a wide frequency band, which may in one embodiment be X band. The single-pole-four-throw (SP4T) switch 70 routes the signal through a selected one of four different delay lines 72, 74, 76, and 78. Another single-pole-four-throw (SP4T) switch 80 then routes the signal from the selected delay line 72, 74, 76, or 78 to the output 82 of the fine true time delay 18 to form the cancellation signal 40. Although only four delay lines were used in the embodiment described, a person skilled in the art would understand that more delay lines and larger switches may be used.

The delay lines 62, 64, 72, 74, 76, and 78 may be low-loss thick copper (Cu) interconnects, which are described further below.

FIG. 1 shows a pair of optional GaN SPDT switches 90 and 92 which can be used to remove the cancellation circuit from the receiver path. When operating under benign conditions, such as no or low power jamming signals present in an EW application, these switches 90 and 92 can remove the cancellation circuit from the receiver path thus reducing the overall noise figure (NF) of the system.

For operating over a very wide frequency band, such as X band and Ku band, similar SP4T GaN switches may be used to channelize multiple cancellation circuits, each one for a different frequency band, in order to cover a wider bandwidth of operation.

As previously mentioned, it is important to minimize the impact of the cancellation circuit to the overall noise figure (NF) of the system. In an example embodiment, without the cancellation circuit, the system NF is defined by the loss of the circulator, which may be about 1 dB, and the NF of the GaN receiver, which may be 2.5 dB, for a system NF of 3.5 dB, with a signal-to-noise ratio (SNR) of 71.3 dB and an intermodulation rejection ratio (IMR) of −19 dBc when a two-tone signal with a −10 dBm COMS signal and a 10 dBm leaked jamming signal respectively is fed into the receiver.

When adding the pair of SPDT optional switches 90 and 92 and operating in benign jamming conditions, for example with a 10 dBm of leaked jamming signal, the overall NF increases to 5.5 dB, the SNR reduces to 69.3 and the IMR slightly improves due to the input loss to −23.2 dBc.

When the cancellation circuit is connected, the additional loss of the 180° hybrid 20, increases the NF to 8.7 dB, but still maintains a high SNR of 65.3 dB while further improving the IMR under benign jamming conditions to −31.2 dBc, thus a low power COMS signal is easier to be identified due to the improved IMR.

A common component on all the proposed circuits is the use of thick copper (Cu) metallization to implement the passive components, such as the delay lines 62, 64, 72, 74, 76, and 78 and the transmission lines. Since the proposed cancellation circuit relies on switched delay lines 62, 64, 72, 74, 76, and 78 to achieve the phase and amplitude alignment, it is imperative that these lines cause minimum conductor loss and offer high power handling.

Figure 4:
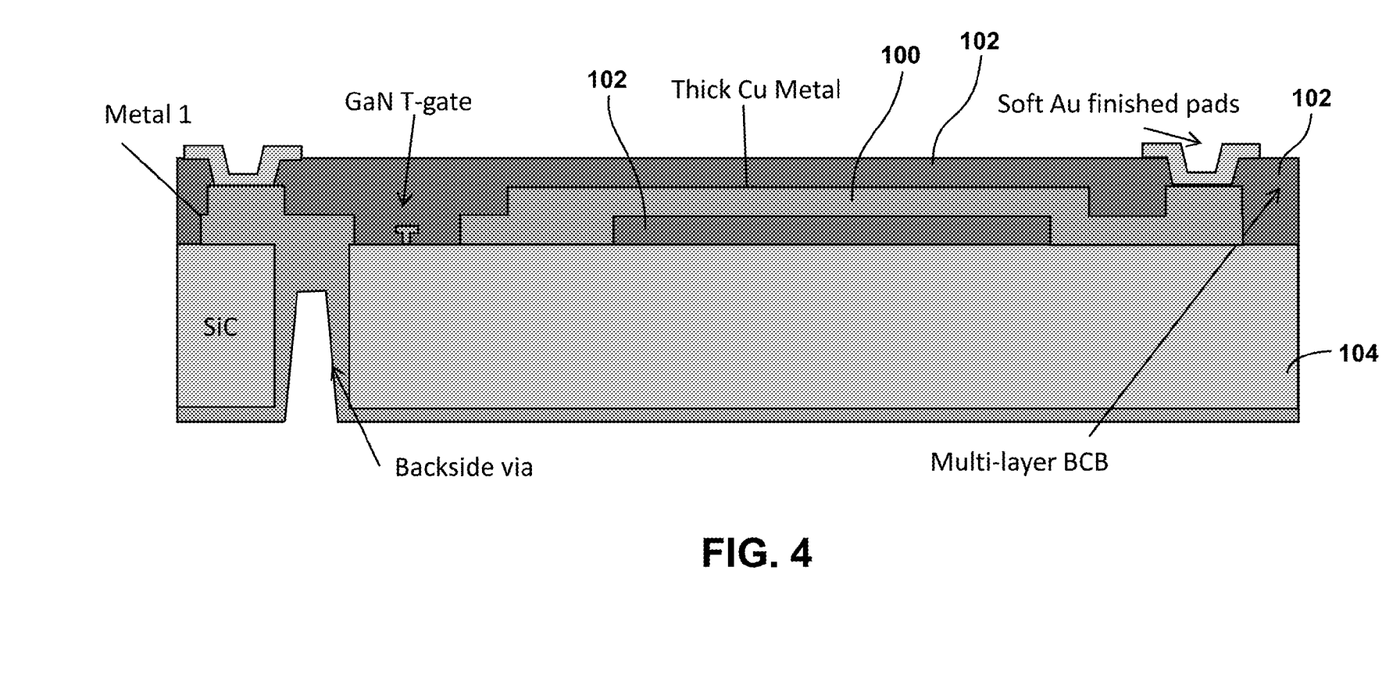
FIG. 4 shows a cross section of a thick Cu interconnection scheme embedded in multi-layer BCB in accordance with the present disclosure.

As shown in FIG. 4, the thick Cu metallization 100 enables thick (6-10 μm) interconnects using single level Cu damascene. The thick Cu interconnects may be embedded in a multi-layer bisbenzocyclobutene (BCB) 102. To achieve high power handling a high thermal conductivity SiC substrate 104 may be used. Thin-film resistor technology may also be used that utilizes epitaxial material and can handle up to 4 A/mm in direct current (DC) current. These features can provide very low-loss delay lines and high-Q passive components.

Figure 5:
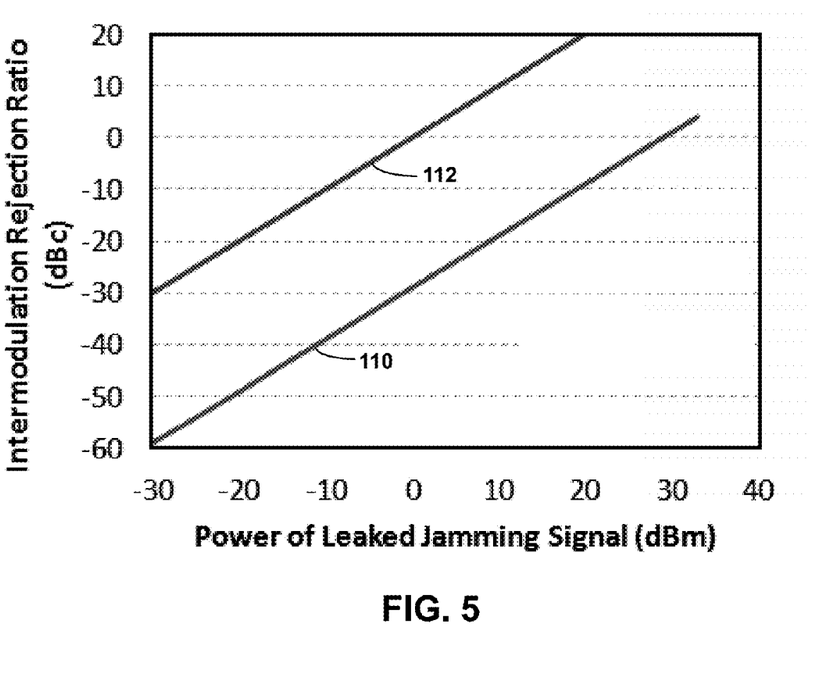
FIG. 5 shows a two-tone simulation showing the expected operational performance improvement in accordance with the present disclosure.

FIG. 5 shows the performance 110 for the cancellation circuit of the present disclosure for a two-tone simulation of a GaN-based multifunctional electronic warfare/communications (EW/COMS) system under STAR operation compared with the performance 112 for a prior art GaAs based system. For the simulation, a low power (−10 dBm) incoming signal, which could be potentially from a friendly communication signal, was assumed. Then the leakage from a Tx signal was varied from −30 dBm to +33 dBm. However, for the GaAs based system only results 112 up to 20 dBm leakage power are presented since a GaAs LNA cannot survive higher input powers. The total gain of the receiver channel, both RF and IF, was assumed to be 30 dB.

As demonstrated in FIG. 5, the GaN-based system results 110 show a 29 dB better IMR. Moreover, the GaAs-based system 112 cannot survive leakage powers higher than 23 dBm. The two-tone simulation shows that for a given IMR (−30 dBc) and instantaneous bandwidth of 1 GHz, the SNR of a GaN receiver is about 30 dB higher than that of a GaAs receiver.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A cancellation circuit for a simultaneous transmit and receive system comprising:
   a coupler coupled to a transmitter for providing a portion of a transmit signal;
   a variable attenuator coupled to the coupler;
   a variable coarse true time delay coupled to an output of the variable attenuator;
   a variable fine true time delay coupled to an output of the variable coarse true time delay, the variable fine true time delay having a cancellation signal output;
   a circulator coupled to the transmit signal and having a receive signal input and having an output having a sum of the receive signal and a leakage signal, the leakage signal being a portion of the transmit signal leaking through the circulator;
   a 180° hybrid having a first input coupled to the cancellation signal output of the variable fine true time delay, a second input coupled to the output having the sum of the receive signal and the leakage signal, and a delta output having a difference between the first input and the second input, the delta output coupled to a receiver;
   a power detector coupled to the delta output; and
   a control circuit coupled to the power detector, the control circuit coupled to the variable attenuator, the variable coarse true time delay, and the variable fine true time delay to adjust an amplitude and phase of the cancellation signal.

2. The cancellation circuit of claim 1 wherein the variable attenuator comprises a 3 bit variable attenuator.

3. The cancellation circuit of claim 1 wherein the variable coarse true time delay comprises:
   a plurality of coarse true time delays;
   an input switch for coupling the output of the variable attenuator to a selected one of the plurality of coarse true time delays; and
   an output switch for coupling the selected one of the plurality of coarse true time delays to the output of the variable coarse true time delay.

4. The cancellation circuit of claim 3 wherein:
   the coarse true time delays comprise:
      a 1.29 ps delay line; and
      a 1.52 ps delay line;
   the input switch comprises a SPDT switch; and
   the output switch comprises a SPDT switch.

5. The cancellation circuit of claim 3 wherein:
   the plurality of coarse true time delays comprise thick copper metal ranging from 6-10 μm in thickness;
   wherein the thick copper metal is embedded in a multi-layer bisbenzocyclobutene (BCB) layer; and
   wherein the BCB layer is on a SiC substrate.

6. The cancellation circuit of claim 3 wherein:
   the input switch comprises GaN; and
   the output switch comprises GaN.

7. The cancellation circuit of claim 1 wherein the variable fine true time delay comprises:
   a plurality of fine true time delays;
   an input switch for coupling the output of the variable coarse true time delay to a selected one of the plurality of fine true time delays; and
   an output switch for coupling the selected one of the plurality of fine true time delays to the cancellation signal output of the variable fine true time delay.

8. The cancellation circuit of claim 7 wherein:
   the fine true time delays comprise:
      a 0.07 ps delay line;
      a 0.14 ps delay line;
      a 0.21 ps delay line;
      a 0.28 ps delay line;
   the input switch comprises a SP4T switch; and
   the output switch comprises a SP4T switch.

9. The cancellation circuit of claim 7 wherein:
   the plurality of fine true time delays comprise thick copper metal ranging from 6-10 μm in thickness;
   wherein the thick copper metal is embedded in a multi-layer bisbenzocyclobutene (BCB) layer; and
   wherein the BCB layer is on a SiC substrate.

10. The cancellation circuit of claim 9 wherein:
    the input switch comprises GaN; and
    the output switch comprises GaN.

11. The cancellation circuit of claim 1 wherein:
    the control circuit controls a selection of an attenuation in the variable attenuator, controls switches to select one of a plurality of coarse true time delays in the variable coarse true time delay, and controls switches to select one of a plurality of fine true time delays in the variable fine true time delay to adjust an amplitude and phase of the cancellation signal.

12. The cancellation circuit of claim 1 wherein:
the variable attenuator, the variable coarse true time delay, the variable fine true time delay, the power detector; and the control circuit comprise GaN.

13. The cancellation circuit of claim 1 further comprising:
a first switch;
a second switch;
the first switch having an input coupled to the output having a sum of the receive signal and a leakage signal, having a first output coupled to the 180° hybrid; and having a second output coupled to a first input of the second switch;
the second switch having a second input coupled to the delta output, and an output coupled to the receiver.

14. A method of providing cancellation for a simultaneous transmit and receive system comprising:
attenuating a portion of a transmit signal using a variable attenuator;
selecting a coarse true time delay to delay the attenuated transmit signal using a variable coarse true time delay;
selecting a fine true time delay of an output of the selectable coarse true time delay to form a cancellation signal using a variable fine true time delay;
providing a sum of a receive signal and a leakage signal from the transmitter;
providing a delta output having a difference between the cancellation signal and the sum of the receive signal and the leakage signal to a receiver; and
controlling the variable attenuator, the variable coarse true time delay, and the variable fine true time delay using the delta signal to adjust an amplitude and phase of the cancellation signal.

15. The method of claim 14 wherein:
the coarse true time delay comprises thick copper metal ranging from 6-10 µm in thickness;
wherein the thick copper metal is embedded in a multilayer bisbenzocyclobutene (BCB) layer; and
wherein the BCB layer is on a SiC substrate.

16. The method of claim 14 wherein:
the fine true time delay comprises thick copper metal ranging from 6-10 µm in thickness;
wherein the thick copper metal is embedded in a multilayer bisbenzocyclobutene (BCB) layer; and
wherein the BCB layer is on a SiC substrate.

17. The method of claim 14 wherein controlling the variable attenuator, the variable coarse true time delay, and the variable fine true time delay using the delta signal to adjust an amplitude and phase of the cancellation signal comprises:
controlling switches to select one of a plurality of coarse true time delays in the variable coarse true time delay; and
controlling switches to select one of a plurality of fine true time delays in the variable fine true time delay to adjust an amplitude and phase of the cancellation signal.

18. The method of claim 17 wherein:
the variable attenuator, the variable coarse true time delay, the variable fine true time delay, the power detector; and the control circuit comprise GaN.

19. The method of claim 14 further comprising:
switching the output having a sum of the receive signal and a leakage signal to be directly coupled to the receive to bypass cancellation.

20. A cancellation circuit for a simultaneous transmit and receive system comprising:
a variable attenuator;
a variable coarse true time delay coupled to the variable attenuator;
a variable fine true time delay coupled to the variable coarse true time delay, the variable fine true time delay having a cancellation signal output;
a circulator coupled to a transmit signal and having a receive signal input and having an output having a sum of the receive signal and a leakage signal, the leakage signal being a portion of the transmit signal leaking through the circulator;
a 180° hybrid having a delta output having a difference between the sum of the receive signal and a leakage signal and the cancellation signal;
a power detector coupled to the delta output; and
a control circuit coupled to the power detector and the the variable attenuator, the variable coarse true time delay, and the variable fine true time delay to adjust an amplitude and phase of the cancellation signal.

21. The cancellation circuit of claim 20 wherein:
the variable attenuator, the variable coarse true time delay, the variable fine true time delay, the power detector; and the control circuit comprise GaN.

* * * * *